Dec. 4, 1923.                            1,476,611
                   G. H. HINES
        V-BLOCK WORKHOLDER OR DRILL JIG
         Filed March 23, 1921    2 Sheets-Sheet 1
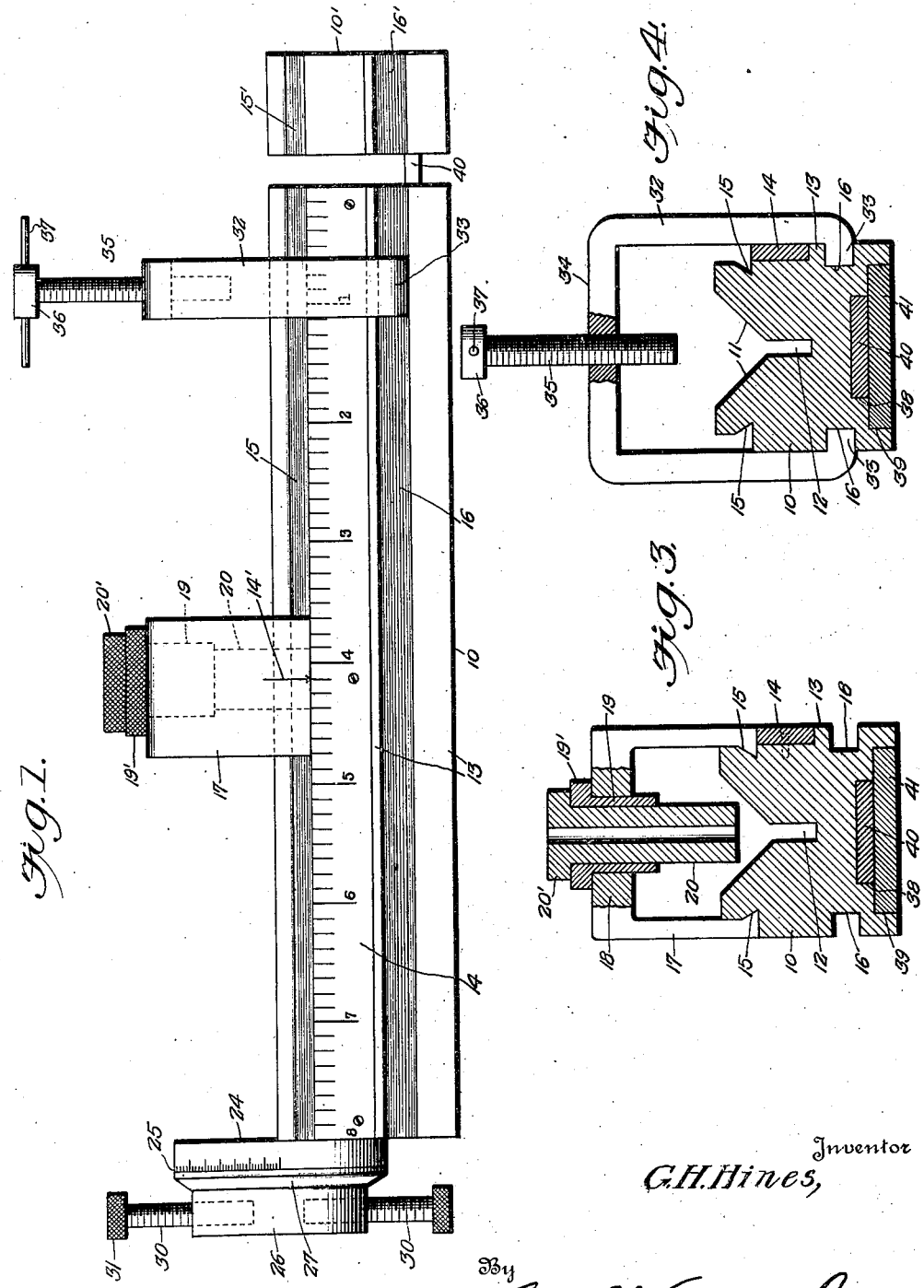
Inventor
G. H. Hines,
By
Geo. F. Kimmel, Attorney Dec. 4, 1923.
G. H. HINES
V-BLOCK WORKHOLDER OR DRILL JIG
Filed March 23, 1921
1,476,611
2 Sheets-Sheet 2
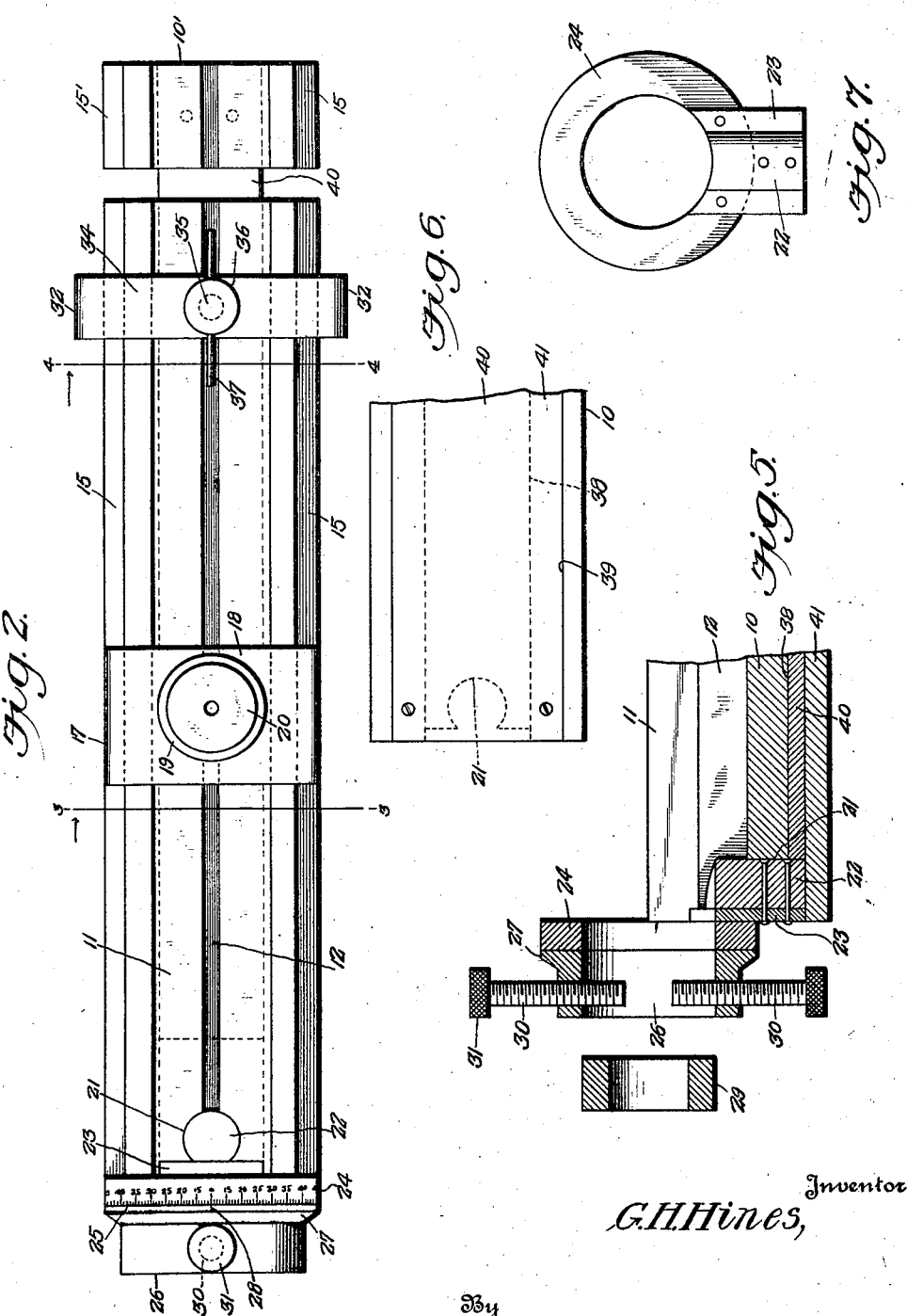

Patented Dec. 4, 1923.

1,476,611

UNITED STATES PATENT OFFICE.

GUSTAVE H. HINES, OF CHICAGO, ILLINOIS.

V-BLOCK WORKHOLDER OR DRILL JIG.

Application filed March 23, 1921. Serial No. 454,937.

*To all whom it may concern:*

Be it known that I, GUSTAVE H. HINES, a citizen of the United States, residing at Chicago, in the county of Cook and State of Illinois, have invented certain new and useful Improvements in a V-Block Workholder or Drill Jig, of which the following is a specification.

The invention relates to improvements in work holders for cylindrical bodies, such as shafts and the like, and more particularly to a type of such work holder commonly known as jigs or V-blocks.

The principal object of the invention is to provide a novel construction of a work holder or jig adapted for securely retaining cylindrical bodies, such as shafts and the like, in position for the accurate transverse drilling of the same.

Another object of the invention is to provide for a device of the character mentioned, and one of a construction and arrangement admitting of the adjustment of the same to accommodate cylindrical bodies of different diameters for the purpose aforesaid.

A further object of the invention is to provide a device of the type mentioned with a means for the adjustment of a drill guide along the work holder or jig in a manner whereby to accurately determine or gauge the distances between the centers of the bores to be made in the cylindrical body secured thereon.

A still further object of the invention is to provide the device contemplated herein with means for accurately determining or gauging the distances between the centers of bores to be formed radially inward and spaced circumferentially of the cylindrical body held in the same.

Another object of the invention is to provide a work holder or jig of the character set forth, and one of a construction adapting the same for the support of varying lengths of cylindrical bodies or stocks.

With the foregoing and other objects in view, the invention resides in the certain novel and useful construction and arrangement of parts as will be hereinafter more fully described, set forth in the appended claims, and illustrated in the accompanying drawings, in which:—

Figure 1 is a front elevation of the preferred embodiment of the invention,

Fig. 2 is a top plan view thereof,

Fig. 3 is a vertical transverse section taken on the line 3—3 of Fig. 2,

Fig. 4 is a view similar to that of Fig. 3 but taken on the line 4—4 of Fig. 2,

Fig. 5 is a fragmentary vertical longitudinal section of one end of the device,

Fig. 6 is a fragmentary plan view of the device corresponding to that as shown in Fig. 5, but with the end gauge removed from position thereon, and Fig. 7 is a detail in end elevation of the end gauge support.

Referring to the drawings, in which similar characters of reference designate corresponding parts in the several views thereof, the numeral 10 designates a V-block formed of an elongated bar of metal having its upper face machined or milled out to form a longitudinally extending slot or groove 11 substantially in the form of a Y in cross section, the channel 12 forming the depending leg of the Y being disposed on the longitudinal center of the V-blocks so that the inclined face of the slot 11 are of equal area to either side thereof. The front vertical faces of the V-block 10 is machined or milled to form a shoulder portion 13 upon which is secured a scale plate 14 having its graduated front face flush in the plane of the vertical flat face of the shoulder portion 13, which portion and the scale 14 extends the entire length of the V-block.

The front and rear vertical faces of the V-block 10 are provided with longitudinally extending angle shaped grooves or guideways 15, the same lying in a common plane horizontally thereon slightly below the top grooved face of the same and further in each vertical face is a longitudinally extending groove or guideway 16 positioned below a groove 15 and having parallel upper and lower walls. The groove 15 in the front wall of the V-block 10 opens outwardly thereof in a plane immediately above the scale plate or strip 14, while the groove 16 of this space is formed in the shoulder portion 13 spaced below the lower parallel edge of said scale plate or strip 14.

Mounted to be slidably adjusted along the pair of grooves or guideways 15 is a substantially inverted U-shaped yoke or bracket 17, and the lower ends of the side walls thereof are formed with inward projections corresponding in contour with and extending into the grooves 15 and the said yoke 17 has formed medially of its connected portion 18, overlying the upper grooved face 11 of the V-block, a circular opening in which is mounted a main bushing 19, also having a circular opening or bore in which is positioned interchangeable bushings 20, the latter being formed with bores of varying sizes one for use with a particularly sized drill bit. The bushing 19 is formed with a flanged head portion 19′ and the bushings 20 with a similarly formed head portion 20′, all of which head portions have their peripheral edges milled or knurled substantially as shown, so as to facilitate the withdrawal and insertion to and from position in the bore of the yoke 17. The opposite sides of the V-block immediately above the grooves or guideways 15 are machined or milled inward of the top face thereof to a depth slightly greater than the major depth of the latter so that the outer vertical faces of the legs of the yoke 17 extend upward flush in the plane of the same. The outer face of the front leg of the yoke 17 is provided with an indicating block 14′ which extends upward for a distance medially of the lower edge thereof, and which is adapted to register with the graduations formed on the out face of the scale plate 14.

Formed at one end of the V-block and opening upwardly on the longitudinal center thereof is formed a circular recess 21, which also opens outwardly of the end wall so as to receive and retain within the same a shiftable brake element 22, which is movable vertically and has secured thereto a transversely extending plate 23, which carries on its upper face, at its upper portion an annular ring or collar 24, the upper half of the circumference of which is formed with a graduated scale 25. Mounted on the annular ring or member 24, concentric with the outer face thereof is a clamp collar 26 of smaller diameter than the diameter at its outer portion of the former, but has its inner portion formed with an inwardly and upwardly inclined flange 27 abutting the outer face of the member 24 with its peripheral edge of equal diameter therewith, which flange has a single indicating point 28 formed on its peripheral edge for cooperation with the graduated scale 25 on the member 24 for the accurate adjustment of the collar 26 in its turning movement to either side of the zero point on the scale 25. The registering bores of the member 24 and the clamp collar 26 are disposed in line with the grooved face 11 of the V-block 10 and the inner diameters of the same represent the greatest diameter for the cylindrical body to be supported on the latter for the working operation thereon. For the purpose of affording a firm grip of the end of a cylindrical body to be engaged in the bore of the clamp collar 26, other than one of equal diameter therewith, interchangeable bushings 29 are provided for insertion into the bore thereof, each having a circular bore corresponding in diameter to that of a particular size of cylindrical body, or a length of stock. For clamping one end of a cylindrical body or length of stock, or a bushing 29 carried thereby, in the bore of the collar 26, the latter is provided with diametrically opposed threaded openings into which are threaded clamp screws 30, the same being formed with knurled or milled heads 31 to facilitate their proper manipulation.

Slidable along the V-block 10 is an inverted substantially U-shaped clamp yoke having its leg portions 32 depending at opposite sides thereof in close sliding contact and having their lower ends inturned, as at 33, for sliding engagement with the grooves or guideways 16. The connected portion 34 of the yoke is formed with a centrally disposed opening downwardly through which is threaded a clamp screw 35 having a circular enlarged upper end portion 36 which has a bar or rod 37 extending diametrically of the same to provide radially extending portions to facilitate the manipulation of the screw into and out of clamping engagement with the work to be laid along the grooved face 11 of the V-block 10.

Formed in the longitudinal center of the under face of the V-block 10 is a groove 38, which opens downwardly of a groove 39 of greater width than the same, and slidably mounted in the groove 38 is a bar 40 which is retained therein by means of a plate 41 secured in the groove 39. This bar 40 is of a length greater than that of the groove 38 so that one end projects outwardly of one end of the V-block 10 opposite to that end on which is mounted a clamp collar 26, and rising from the free end of this bar 40 is a V-block section 10′ of much less length than that of the main V-block body 10, but which is of the same cross sectional area and configuration, and in the opposite sides of which is formed grooved or guideways 15′ and 16′ complemental to the grooves or guideways 15 and 16, respectively, of the latter.

In the use of the jig or work holder thus provided and assembled, a desired length of cylindrical stock, such as a shaft section, is laid on the V face of the block 10, and one end of the same is clamped between the screws 30 of the clamp collar 26, and if the stock is of less diameter than that of the latter, a bushing 29 is secured on the engaged end of the stock and the screws 30 caused to engage the bushing for the desired clamping action. The clamp yoke 34 is now moved to proper position and has the screw 35 manipulated to hold the opposite end of the stock, and the latter is ready for the first drilling operation. The drill guide yoke 17 is now moved along the V-block 10 until its proper starting position is fixed, after which a drill is inserted downward of the bore of the bushing 19, or a supplemental bushing 20 carried thereby, and a hole is drilled in the stock.

If a series of holes are to be drilled along the length of the stock, the drill guide 17 is moved to the next drilling position, the desired distances between the centers of the openings to be drilled being accurately determined by the registering of the indication arrow or mark 14', on the drill guide, with the proper graduations of the scale 14. If a piece of stock is of a much greater length than that of the main V-block 10, the supplemental V-block 10' is moved outward from the end of the latter to the required distance, and if desired, the clamp yoke 34 can be moved with the block 10' for engagement with the extended end of the stock. For the drilling of a series of holes circumferentially of the stock, the same can be turned for the purpose by the manipulation of the clamp collar 26 and the proper turning movement of the same, or the distances between the centers of the holes to be drilled, can be determined by the setting of the main indication arrow or mark 28, on the clamp collar 26, at necessary or desired graduations on the scale 24 to either side of the zero point thereon.

From the foregoing, it will be readily apparent that the invention provides for a universally adjustable jig or V-block form of work holder, and one that is adaptable for supporting pieces of cylindrical stock varying in length throughout a comparatively wide range as well as in diameter, and one which is capable of being accurately adjustable for the drilling of holes in any desired relation one with respect to the other, either lengthwise, circumferentially, or spirally thereof, and for the accurate spacing of the distances between the centers of the openings to be drilled.

Having thus fully described the invention, what is claimed, is:—

1. A jig comprising a V-block, means slidably engaging in the sides of the block for clamping a length of cylindrical stock lengthwise of said V-block, a drill guide engaging in the sides of and movable longitudinally of said V-block, means for permitting of the accurate adjustment of said drill guide to predetermined distances between the center of the holes to be drilled in the stock, and a vertically movable bracket at one end of said V-block and carrying circumferentially adjustable stock holding means.

2. A jig comprising V-blocks opposed end to end, means for adjusting said blocks one with respect to the other for accommodating varying lengths of stock, means engaging in the sides of one of said blocks for clamping the stock in position, a drill guide engaging in the sides of and movably mounted on one of said V-blocks, means for permitting the accurate adjustment of said drill guide to predetermined distances between the centers of the holes to be drilled in the stock, and a vertically movable bracket at one end of one of the blocks and carrying a circumferentially adjustable stock holding means.

3. A jig comprising an elongated V-block, clamping means movable along and engaging with said V-block for securing varying lengths of stock thereon, a drill guide movable along and engaging with said V-block, a graduated scale carried lengthwise of said V-block for the accurate adjustment of said drill guide for the drilling operation, and a vertically movable bracket carrying a circumferentially adjustable stock holding means.

4. A jig comprising an elongated V-block, clamping means movable along said V-block for securing varying lengths of stock thereon, a drill guide movable along said V-block, a graduated scale carried lengthwise of said V-block for the accurate adjustment of said drill guide for the drilling operation, a vertically movable element connected with said block and carrying a circumferentially adjustable stock holding means provided with a graduated scale for accurately determining circumferential adjustment, and said block having each side provided with a pair of grooves with which engage said clamping means and drill guides.

5. A jig comprising an elongated V-block, a second V-block connected to said elongated V-block and movable outwardly from one end thereof for supporting in position varying lengths of cylindrical stock, a drill guide movable along said V-blocks, a clamping device movable along said V-blocks for securing the stock in position thereon, a graduated scale carried on said elongated V-block for the accurate adjustment of said drill guide, a vertically movable bracket connected with said elongated V-block and carrying a circumferentially adjustable stock holding means, and said blocks having the sides thereof provided with grooves engaged by said drill guide and clamping device.

6. A jig comprising an elongated V-block, a relatively short V-block, a bar slidable longitudinally of said elongated V-block for supporting said short V-block at its free end, a drill guide extending over said elongated V-block and slidably engaging in the sides thereof, a graduated scale arranged longitudinally of the front face of said elongated V-block and associated with said drill guide for the accurate adjustment of the stock thereon, a clamping device arranged over said elongated V-block and slidably engaging in the sides thereof and adapted to secure on said V-block varying lengths of cylindrical stock, a vertically movable bracket arranged at the end of said elongated V-block and carrying a circumferentially adjustable stock holding means, and a graduated scale associated with said means for accurately adjusting the circumferential adjustment thereof.

7. A jig comprising an elongated V-block having each of its sides provided with an angle shaped and a squared groove, one arranged above the other, clamping means extending over said block and slidably engaging in said squared grooves and adapted to secure varying lengths of stock on the block, a drill guide extending over said block and slidably engaging in said V-shaped grooves, a graduated scale carried lengthwise of said block for accurately adjusting said drill during the drilling operation, and a vertically movable bracket at one end of said block for carrying a circumferentially adjustable stock holding means.

8. A jig comprising an elongated V-block having each of its sides provided with a pair of grooves, one arranged above the other, clamping means extending over said block and slidably engaging in the lower groove and adapted to secure varying lengths on the stock, a drill guide extending over said block and slidably engaging in said upper grooves, a graduated scale extending lengthwise of said block for accurately adjusting said drill guide during the drilling operation, and a vertically movable bracket at one end of said block and carrying a circumferentially adjustable stock holding means.

9. A jig comprising a V-block, means engaging in the sides of the V-block for securing a length of stock thereon, a drill guide movable longitudinally of said V-block, and a vertically movable bracket arranged at one end of the block and carrying a circumferentially adjustable stock holding means.

10. A jig comprising an elongated V-block having each of its sides provided with a pair of grooves, one arranged above the other, stock clamping means associated with and slidably engaging in one of said grooves on each side of the block, a drill guide arranged over said block and slidably engaging in the other of said grooves on each side of the block, a graduated scale disposed lengthwise of said block for the accurate adjustment of said drill guide during the drilling operation, and a bracket element at one end of said block and carrying a circumferentially adjustable stock holding means.

11. A jig comprising an elongated V-block having each of its sides provided with a pair of grooves, one arranged above the other, stock clamping means associated with and slidably engaging in one of said grooves on each side of the block, a drill guide arranged over said block and slidably engaging in the other of said grooves on each side of the block, a graduated scale disposed lengthwise of said block for the accurate adjustment of said drill guide during the drilling operation, a bracket element at one end of said block and carrying a circumferentially adjustable stock holding means, and a graduated scale associated with said means for accurately determining the circumferential adjustment of the stock.

In testimony whereof, I affix my signature hereto.

GUSTAVE H. HINES.